US012752851B2

(12) United States Patent
Tamanyu et al.

(10) Patent No.: US 12,752,851 B2
(45) Date of Patent: Oct. 6, 2026

(54) VEHICLE REAR SECTION STRUCTURE

(71) Applicant: TOYOTA JIDOSHA KABUSHIKI KAISHA, Toyota (JP)

(72) Inventors: Tomohiro Tamanyu, Toyota (JP); Shota Shimizu, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 310 days.

(21) Appl. No.: 18/583,690

(22) Filed: Feb. 21, 2024

(65) Prior Publication Data

US 2024/0336303 A1 Oct. 10, 2024

(30) Foreign Application Priority Data

Apr. 4, 2023 (JP) ................................ 2023-060979

(51) Int. Cl.
*B62D 21/15* (2006.01)

(52) U.S. Cl.
CPC ................................ *B62D 21/152* (2013.01)

(58) Field of Classification Search
CPC ...... B62D 21/152; B62D 21/02; B62D 21/03; B60K 1/04; B60K 2015/0675
See application file for complete search history.

(56) References Cited

U.S. PATENT DOCUMENTS

| | | | | |
|---|---|---|---|---|
| 2011/0290838 | A1* | 12/2011 | Souma .................. | B62D 43/10 224/492 |
| 2019/0276093 | A1 | 9/2019 | Tatsuwaki et al. | |
| 2020/0130747 | A1 | 4/2020 | Hasegawa et al. | |
| 2021/0362786 | A1 | 11/2021 | Kim et al. | |

FOREIGN PATENT DOCUMENTS

| | | | |
|---|---|---|---|
| JP | 2014008835 | A * | 1/2014 |
| JP | 6106878 | B | 4/2017 |
| JP | 2019-156063 | A | 9/2019 |
| JP | 2020-066337 | A | 4/2020 |
| JP | 2021-181300 | A | 11/2021 |

* cited by examiner

*Primary Examiner* — Nicholas McFall
*Assistant Examiner* — Eric Acosta
(74) *Attorney, Agent, or Firm* — SOLARIS Intellectual Property Group, PLLC

(57) ABSTRACT

A rear side member is provided with a first bead that is set so as to be weaker than other portions of the rear side member. The first bead is set so as to induce deformation of the rear side member toward a vehicle width direction inner side and toward a lower side when a collision load is input from a rear cross member at a time of a rear collision of a vehicle, and when the collision load is input from the rear cross member at the time of a rear collision of the vehicle, the rear side member is deformed toward the vehicle width direction inner side, and is deformed toward the lower side, with the first bead as a starting point.

2 Claims, 6 Drawing Sheets

VEHICLE REAR SECTION STRUCTURE

CROSS-REFERENCE TO RELATED APPLICATION

This application is based on and claims priority under 35 USC § 119 from Japanese Patent Application No. 2023-060979 filed on Apr. 4, 2023, the disclosure of which is incorporated by reference herein.

TECHNICAL FIELD

The present disclosure relates to a vehicle rear section structure.

RELATED ART

Japanese Patent Application Laid-Open (JP-A) No. 2019-156063 (Patent Document 1) discloses technology related to a rear section structure of a vehicle at which a battery is installed below a vehicle floor. In this prior art, a cross member (rear cross member) that connects rear extension portions (rear end portions) of rear side frames provided in a pair at the left and right of a vehicle body (vehicle) is provided. Consequently, in this prior art, collision energy can be efficiently absorbed, even in a case in which a collision load has been input biased toward one side of a rear side frame (rear side member), at a time of a rear end collision of the vehicle.

However, in the aforementioned prior art, at a time of a rear end collision of the vehicle (hereinafter referred to as "a time of a rear collision of the vehicle"), in a case in which the rear cross member has a curved shape projecting toward a vehicle rear side, if the rear cross member is pushed in toward a vehicle front side due to a barrier, an input in a vehicle lateral direction toward a vehicle width direction outer side acts on the rear side member. In such a case, movement of the rear cross member toward the vehicle front side is further promoted, and there is a possibility that a collision load that has been input to the rear cross member will be transmitted to a battery or a fuel tank, or the like, and adversely influence the battery or the fuel tank.

SUMMARY

In consideration of the aforementioned circumstances, an object of the present disclosure is to obtain a vehicle rear section structure that is capable of suppressing influence on a battery or a fuel tank at a time of a rear collision of a vehicle.

A vehicle rear section structure according to a first aspect includes: left and right rear side members that are respectively provided at both vehicle width direction sides of a rear floor pan, and that each extend in a vehicle front-rear direction; a rear cross member that extends in a vehicle width direction, both vehicle width direction end portions of the rear cross member being respectively joined with vehicle front-rear direction rear end portions of the left and right rear side members; a battery or a fuel tank that is provided between the left and right rear side members, and that is disposed at a vehicle up-down direction lower side of the rear floor pan; and a first weak portion that is provided at a side toward a joining portion, which joins with the rear cross member, in each rear side member, that is weaker than other portions of the rear side member, and that is set so as to induce deformation of the rear side member toward a vehicle width direction inner side and toward a vehicle up-down direction lower side at a time of a collision from a vehicle rear side.

The vehicle rear section structure according to the first aspect includes the left and right rear side members, the rear cross member, the battery or the fuel tank, and the first weak portion.

The left and right rear side members are respectively provided at both vehicle width direction sides of the rear floor pan, and each extend in the vehicle front-rear direction. The rear cross member extends in the vehicle width direction, and both longitudinal direction (vehicle width direction) end portions of the rear cross member are respectively joined with the vehicle front-rear direction rear end portions of the left and right rear side members. The battery or the fuel tank is provided between the left and right rear side members, and is disposed at the vehicle up-down direction lower side of the rear floor pan.

The first weak portion is provided at the side toward the joining portion, which joins with the rear cross member, in each rear side member, and is weaker than other portions of the rear side member. Further, the first weak portion is set so as to induce deformation of the rear side member toward the vehicle width direction inner side and toward the vehicle up-down direction lower side at the time of a rear collision of the vehicle.

Thus, in the present aspect, due to the first weak portion being provided, when a collision load is input from the rear cross member at the time of a rear collision of the vehicle, the rear side member is deformed toward the vehicle width direction inner side, and is deformed toward the vehicle up-down direction lower side, with the first weak portion as a starting point.

As a comparative example, in a case in which an input in the vehicle lateral direction toward the vehicle width direction outer side acts on the rear side member due to the rear cross member being pushed in toward the vehicle front side due to a rear collision of the vehicle, movement of the rear cross member toward the vehicle front side may be further promoted. In such a case, there is a possibility that a collision load that has been input to the rear cross member will be transmitted to the battery or the fuel tank, or the like, and adversely influence the battery or the fuel tank.

In contrast thereto, in the present aspect, when a collision load is input from the rear cross member at the time of a rear collision of the vehicle, the rear side member is deformed toward the vehicle width direction inner side, and is deformed toward the vehicle up-down direction lower side, and movement of the rear cross member toward the vehicle front side is thereby suppressed. Accordingly, in the present invention, it is possible to suppress influence on the battery or the fuel tank, such as the collision load that has been input to the rear cross member being transmitted to the battery or the fuel tank, or the like.

It should be noted that examples of the first weak portion include a bead or a notch, for example. Further, aside from this, the first weak portion may be formed by formation of a curved portion or the like, since it is sufficient that a starting point for inducing deformation is configured. Similarly to the first weak portion, the same also applies to a second weak portion, which will be described below.

A vehicle rear section structure according to a second aspect is the vehicle rear section structure according to the invention recited in the first aspect, which further includes a second weak portion that is provided in each rear side member further toward the vehicle rear side than the battery or the fuel tank and further toward a vehicle front side than the first weak portion, that is weaker than other portions of the rear side member, and that induces deformation of the rear side member toward the vehicle up-down direction lower side at the time of a collision from the vehicle rear side.

The vehicle rear section structure according to the second aspect further includes the second weak portion. The second weak portion is provided in each rear side member further toward the vehicle rear side than the battery or the fuel tank and further toward the vehicle front side than the first weak portion, is weaker than other portions of the rear side member, and is set so as to induce deformation of the rear side member toward the vehicle up-down direction lower side at the time of a rear collision of the vehicle.

Thus, in the present aspect, due to the second weak portion being further provided, when a collision load is input from the rear cross member at the time of a rear collision of the vehicle, the rear side member is deformed toward the vehicle width direction inner side, and is deformed toward the vehicle up-down direction lower side, with the first weak portion as a starting point, and the rear side member is deformed toward the vehicle up-down direction lower side with the second weak portion as a starting point.

In the present aspect, when the collision load is input from the rear cross member at the time of a rear collision of the vehicle, since the rear side member is further deformed toward the vehicle up-down direction lower side due to the second weak portion, movement of the rear cross member toward the vehicle front side can be further suppressed. Accordingly, in the present invention, influence on the battery or the fuel tank can be further suppressed.

A vehicle rear section structure according to a third aspect is the vehicle rear section structure according to the second aspect, wherein the first weak portion is a first bead that is provided in each rear side member at a vehicle width direction inner side and at a vehicle up-down direction upper end portion, and that is formed to be concave toward a vehicle width direction outer side, and the second weak portion is a second bead that is provided in each rear side member at a vehicle up-down direction lower portion side, and that is formed to be concave toward a vehicle up-down direction upper side, a depth of the first bead being set so as to be deeper than a depth of the second bead.

In the vehicle rear section structure according to the third aspect, the first weak portion is a first bead that is provided in each rear side member at the vehicle width direction inner side and at the vehicle up-down direction upper end portion, and that is formed to be concave toward the vehicle width direction outer side. Consequently, when a collision load is input from the rear cross member at the time of a rear collision of the vehicle, the rear side member can be deformed toward the vehicle width direction inner side, and can be deformed toward the vehicle up-down direction lower side, with the first bead as a starting point.

Further, the second weak portion is a second bead that is provided in each rear side member at the vehicle up-down direction lower portion side, and that is formed to be concave toward the vehicle up-down direction upper side. Consequently, when the collision load is input from the rear cross member at the time of a rear collision of the vehicle, the rear side member can be deformed toward the vehicle up-down direction lower side with the second bead as a starting point.

In the present aspect, the depth of the first bead is set so as to be deeper than the depth of the second bead. Consequently, in the present invention, when the collision load is input from the rear cross member at the time of a rear collision of the vehicle, the rear side member can be deformed with the second bead as a starting point after the rear side member has been deformed with the first bead as a starting point, and a deformation shape of the rear side member can be stabilized.

A vehicle rear section structure according to a fourth aspect is the vehicle rear section structure according to the third aspect, wherein each rear side member is configured with plural members in the vehicle front-rear direction, the members are welded together between the second bead, and the battery or the fuel tank, in the vehicle front-rear direction of the rear side member, and a laser welding line at which the members are welded together is formed so as to be inclined toward a vehicle up-down direction upper side on progression toward a vehicle front-rear direction rear side.

In the vehicle rear section structure according to the fourth aspect, each rear side member is configured with plural members in the vehicle front-rear direction, and the members are welded together between the second bead, and the battery or the fuel tank, in the rear side member.

Thus, by configuring each rear side member with plural members in the vehicle front-rear direction, and by welding the members to each other at locations therebetween, rigidity in the vehicle front-rear direction of the rear side member can be improved. Further, by welding the members to each other at locations therebetween (welding portions), a difference in rigidity between the welding portions and the second bead is further increased, and a deformation position having the second bead as a starting point can be further stabilized.

Moreover, at the laser welding line at which the members are welded together, rigidity is higher than at positions at the front and rear of the laser welding line, and a reaction force with respect to an impact is also increased by a corresponding amount. Thus, due to the laser welding line being formed so as to be inclined toward the vehicle up-down direction upper side on progression toward the vehicle front-rear direction rear side, after the rear side member has been deformed toward the vehicle up-down direction lower side with the second bead as a starting point, wrinkling of a front end portion of a deforming portion of the rear side member can be stabilized by the laser welding line, which has substantially the same shape, and movement of the deforming portion toward the front side can be suppressed.

A vehicle rear section structure according to a fifth aspect is the vehicle rear section structure according to the first aspect, wherein each rear side member is configured with plural members in the vehicle front-rear direction, and vehicle front-rear direction positions of welding portions at which the members are welded together are set so as to be different positions at a vehicle width direction inner side and a vehicle width direction outer side of the rear side member.

In the vehicle rear section structure according to the fifth aspect, each rear side member is configured with plural members in the vehicle front-rear direction of the rear side member. Further, the vehicle front-rear direction positions of the welding portions at which the members are welded together are set so as to be different positions at the vehicle width direction inner side and the vehicle width direction outer side of the rear side member.

Thus, in the present aspect, by changing portions having high rigidity and portions that are weak, at the vehicle width direction inner side and the vehicle width direction outer side, along the vehicle front-rear direction of the rear side member, a deformation mode can be adjusted in the rear side member.

The vehicle rear section structure according to the present disclosure can suppress influence on a battery or a fuel tank at a time of a rear collision of a vehicle.

DETAILED DESCRIPTION

A vehicle rear section structure 10 according to an exemplary embodiment of the present invention will be explained, based on the following drawings. It should be noted that arrow FR, arrow UP, and arrow RH, which are appropriately illustrated in the respective drawings, respectively indicate a vehicle frontward direction (a vehicle progression direction), a vehicle upward direction, and a vehicle rightward direction (toward one side in a vehicle width direction). Hereinafter, unless specifically stated otherwise, in cases in which explanation is given by simply referring to front-rear, left-right, and up-down directions, these respectively indicate front and rear in a vehicle front-rear direction, left and right in a vehicle left-right direction (vehicle width direction), and up and down in a vehicle up-down direction.

Configuration of Vehicle Rear Section Structure

First, a configuration of a vehicle rear section structure 10 according to an exemplary embodiment of the present invention will be explained.

Figure 1:
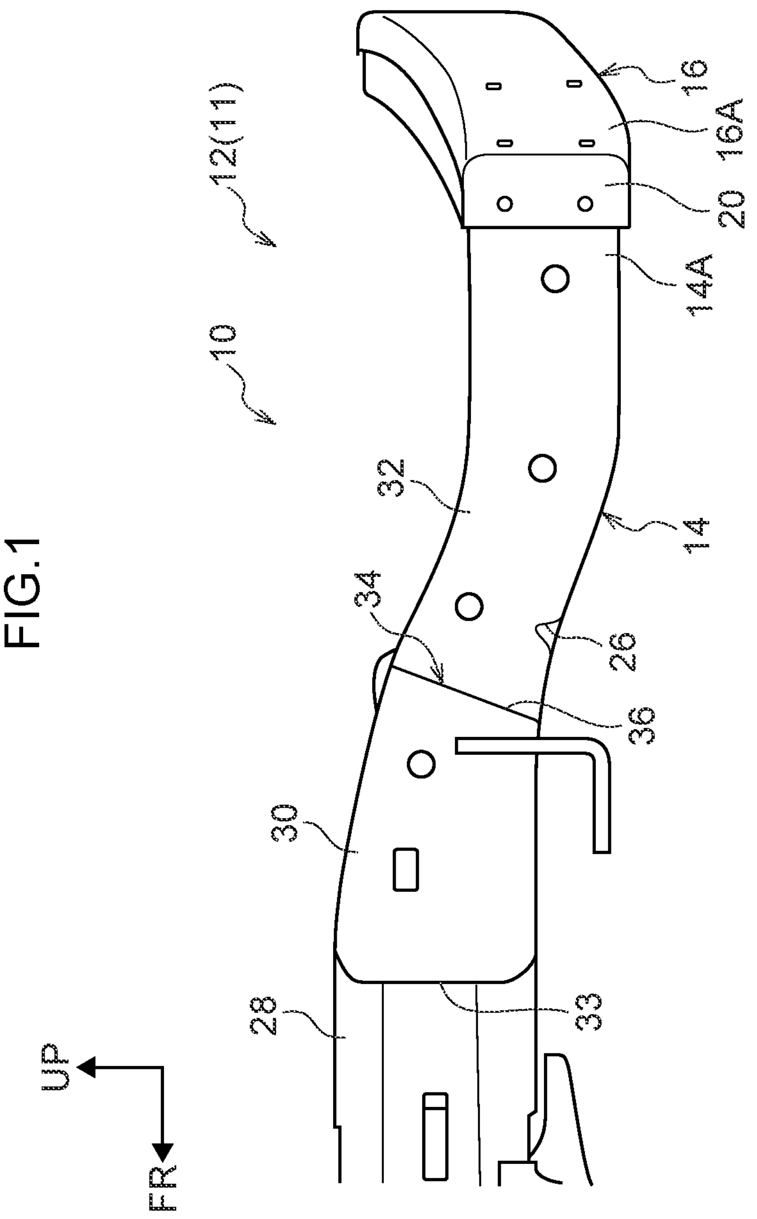
FIG. 1 is a left side view viewed from a left side and illustrating a vehicle rear section to which a vehicle rear section structure according to the present exemplary embodiment has been applied.
Figure 2:
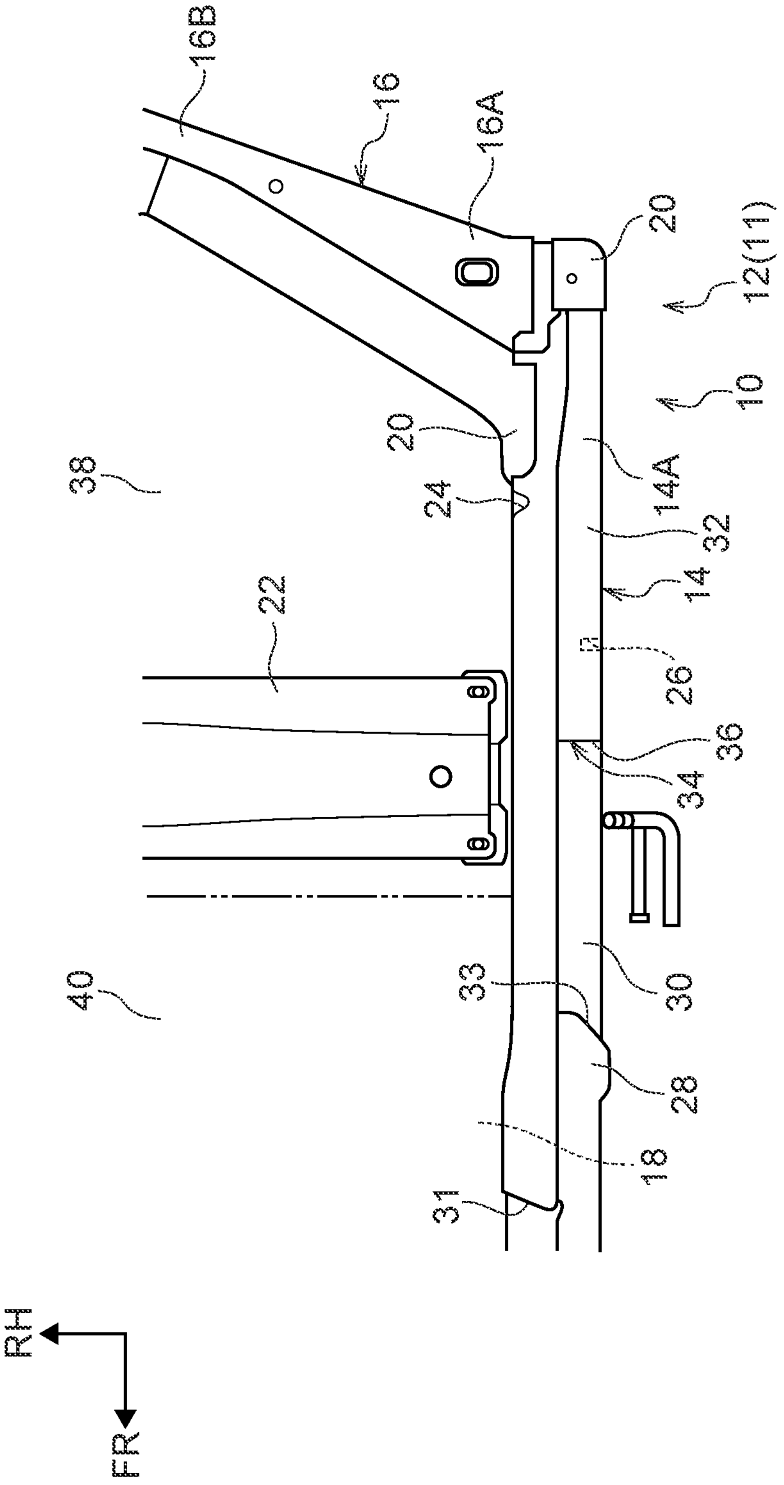
FIG. 2 is a top view viewed from an upper side and illustrating a left side of the vehicle rear section to which the vehicle rear section structure according to the present exemplary embodiment has been applied.

FIG. 1 is a side view of a left side of a vehicle rear section (vehicle body rear section) 12 to which the vehicle rear section structure 10 according to an exemplary embodiment of the present invention has been applied, and FIG. 2 is a top view of the left side of the vehicle rear section 12. As illustrated in FIGS. 1 and 2, the vehicle rear section structure 10 includes left and right rear side members 14, a rear cross member 16, and a battery (or fuel tank) 18. It should be noted that, in FIG. 2, only the left side of the vehicle rear section 12 is illustrated, but that a right side is also substantially the same as the left side.

The rear side members 14 are respectively provided at the left and right of a rear floor pan (not illustrated in the drawings) and respectively extend in the front-rear direction. The rear cross member 16 extends along the vehicle width direction, and both end portions 16A of the rear cross member 16 are respectively joined with rear end portions 14A of the left and right rear side members 14, via joining portions 20 formed by welding or the like. Further, the rear cross member 16 has a gently curved shape projecting toward a vehicle rear side.

The battery 18 is mounted at the left and right rear side members 14, is provided between the left and right rear side members 14, and is disposed at a lower side of the rear floor pan. Further, a cross member 22 spans between the left and right rear side members 14 at a rear side of the battery 18.

It should be noted that the battery 18 does not necessarily need to be mounted at the rear side members 14, and although not illustrated in the drawings, the battery 18 may be mounted at other members.

Rear Side Member

The rear side member 14 will be explained.

The rear side member 14 in the present exemplary embodiment has, for example, a square tube shape configuring a closed cross-section portion in a cross-sectional shape cut along the vehicle width direction.

Further, each rear side member 14 is provided with a first bead (first weak portion) 24 and a second bead (second weak portion) 26 that are set so as to be weaker than other portions of the rear side member 14.

The first bead 24 is set so as to induce deformation of the rear side member 14 toward an inner side in the vehicle width direction and toward a lower side, when a collision load is input from the rear cross member 16 at a time of a rear collision of a vehicle 11. For example, the first bead 24 is provided in the rear side member 14 at a side toward the joining portion 20, which joins with the rear cross member 16, is provided at the vehicle width direction inner side and at an upper end portion of the rear side member 14, and is formed to be concave toward a vehicle width direction outer side. A depth of the first bead 24 is set so as to be deeper than that of the second bead 26, which will be described below.

Meanwhile, the second bead 26 is set so as to induce deformation of the rear side member 14 toward the lower side, when the collision load is input from the rear cross member 16 at the time of a rear collision of the vehicle 11. For example, the second bead 26 is provided in the rear side member 14 further toward the rear side than the battery 18 and further toward the front side than the first bead 24, is provided at a lower portion side of the rear side member 14, and is formed to be concave toward an upper side.

Further, in the present exemplary embodiment, the rear side member 14 is configured with, for example, plural members 28, 30, and 32 in the vehicle front-rear direction, and adjacent members 28, 30, and 32 are welded (joined) together by laser welding. In this regard, a welding portion 34 at which the member 30 and the member 32 are welded is set so as to be provided between the second bead 26 and the battery 18. Further, a laser welding line 36 formed at the welding portion 34 is formed so as to be inclined toward the upper side on progression toward the rear side.

Further, vehicle front-rear direction positions of welding portions 31, 33, and 34 in the rear side member 14 are set so as to be different positions at the vehicle width direction inner side and the vehicle width direction outer side of the rear side member 14. It should be noted that the laser welding line 36 is provided at the vehicle width direction outer side of the rear side member 14.

Operation and Effects of Vehicle Rear Section Structure

Next, operation and advantageous effects of the vehicle rear section structure 10 according to the exemplary embodiment of the present invention will be explained.

As illustrated in FIGS. 1 and 2, in the present exemplary embodiment, the first bead 24 and the second bead 26 that are set so as to be weaker than other portions of the rear side member 14 are respectively provided in the rear side member 14.

Figure 3:
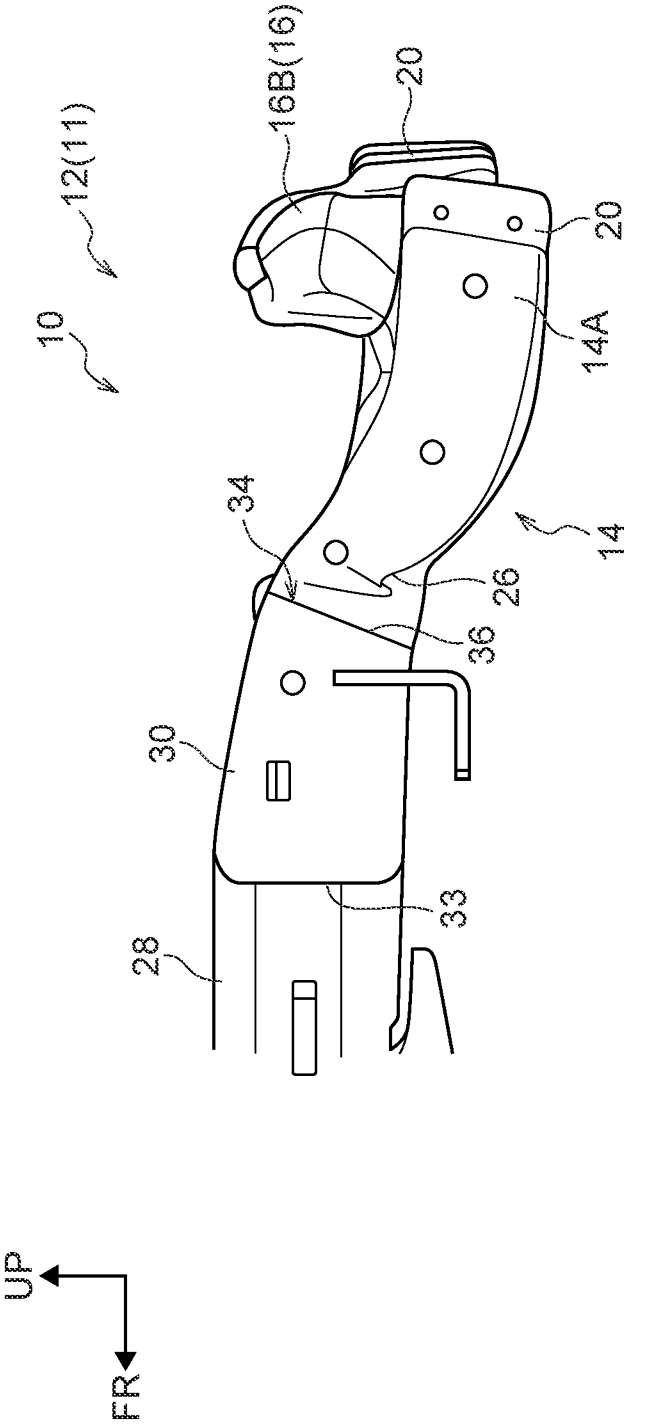
FIG. 3 is a left side view corresponding to FIG. 1 and illustrating a state at a time of a rear collision of a vehicle.
Figure 4:
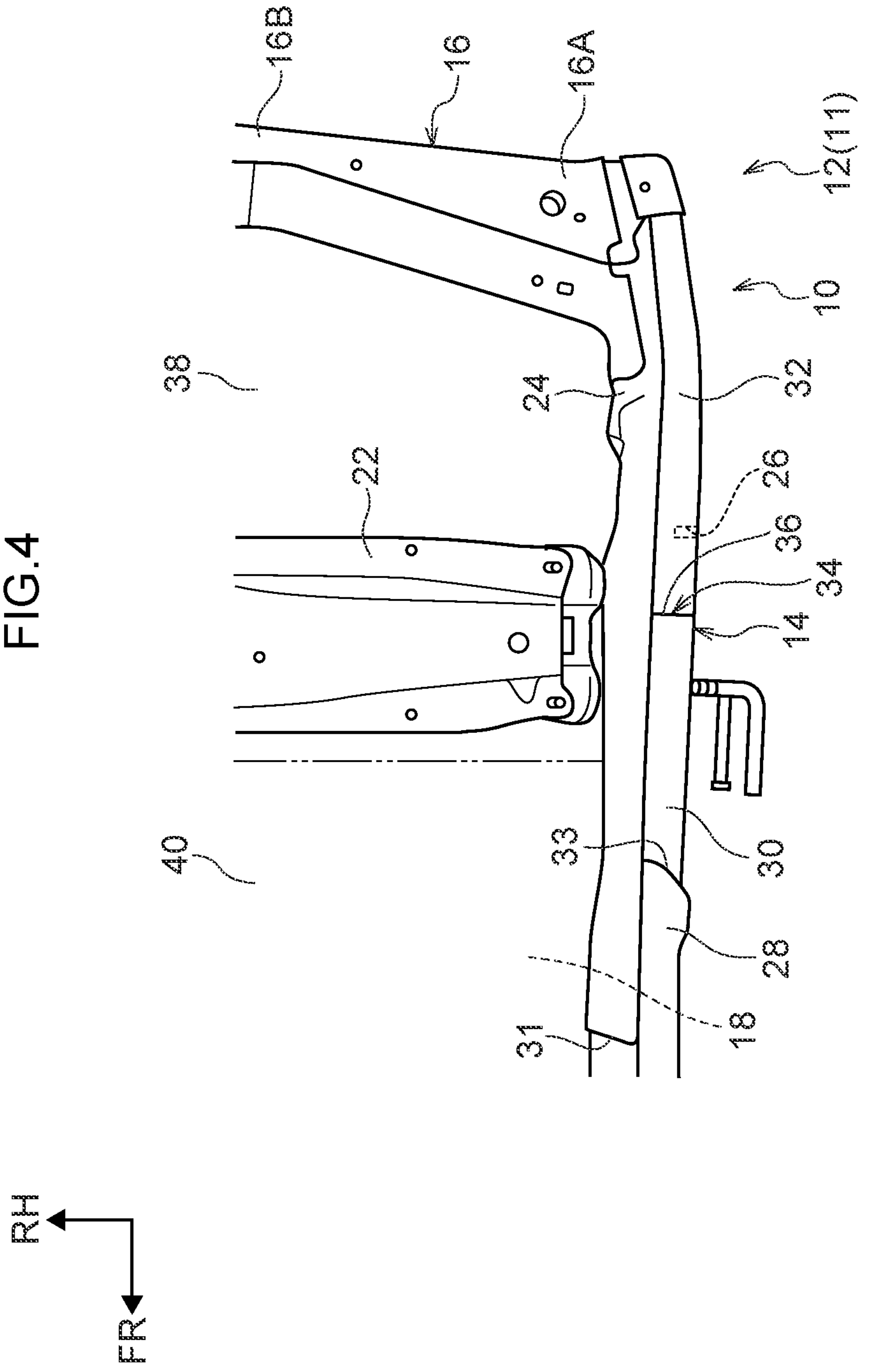
FIG. 4 is a top view corresponding to FIG. 2 and illustrating a state at a time of a rear collision of the vehicle.

The first bead 24 is set so as to induce deformation of the rear side member 14 toward the vehicle width direction inner side and toward the lower side, when a collision load is input from the rear cross member 16 at the time of a rear collision of the vehicle 11. Namely, in the present exemplary embodiment, due to the first bead 24 being provided, when a collision load is input from the rear cross member 16 at the time of a rear collision of the vehicle 11, the rear side member 14 is deformed toward the vehicle width direction inner side and is deformed toward the lower side, with the first bead 24 as a starting point, as illustrated in FIGS. 3 and 4.

As a comparative example, although not illustrated in the drawings, when the rear cross member 16 is pushed in toward the front side due to a rear collision of the vehicle 11, since the rear cross member 16 has a curved shape projecting toward the vehicle rear side, there is a possibility that the left and right rear side members 14 will be pushed out toward the vehicle width direction outer sides due to deformation (for example, extension) of the rear cross member 16. In such a case, movement of the rear cross member 16 toward the front side is promoted, and there is a possibility that a collision load that has been input to the rear cross member 16 will be transmitted to the battery 18, or the like, and adversely influence the battery 18.

In contrast thereto, in the present exemplary embodiment, as described above, when a collision load is input from the rear cross member 16 at the time of a rear collision of the vehicle 11, the rear side members 14 are deformed toward the vehicle width direction inner side and are deformed toward the lower side. When the rear side members 14 are deformed toward the vehicle width direction inner side, vehicle width direction lengths of the rear end portions 14A of the left and right rear side members 14 become shorter, and the rear cross member 16 is deformed such that, for example, a longitudinal direction central portion 16B thereof bulges toward the upper side by a corresponding amount.

Thus, in the present exemplary embodiment, due to the rear side members 14 being deformed toward the vehicle width direction inner side and being deformed toward the lower side, input to the left and right rear side members 14 toward the vehicle width direction outer sides is suppressed, and movement of the rear cross member 16 toward the vehicle front side is suppressed. As a result, in the present exemplary embodiment, it is possible to suppress influence on the battery 18, such as transmission of a collision load that has been input to the rear cross member 16 to the battery 18, or the like.

Namely, in the present exemplary embodiment, the vehicle rear section 12, including the rear side members 14, is divided into a deforming region 38 that is capable of deformation, and a non-deforming region 40 that suppresses deformation, and the battery 18 or the like is provided in the non-deforming region 40. For example, a front side of the cross member 22 is configured as the non-deforming region 40, and a rear side of the cross member 22 is configured as the deforming region 38. In the deforming region 38, collision energy is absorbed due the rear side members 14 being deformed, and in the non-deforming region 40, the battery 18 or the like is protected due to deformation of the rear side members 14 being suppressed.

Figure 5:
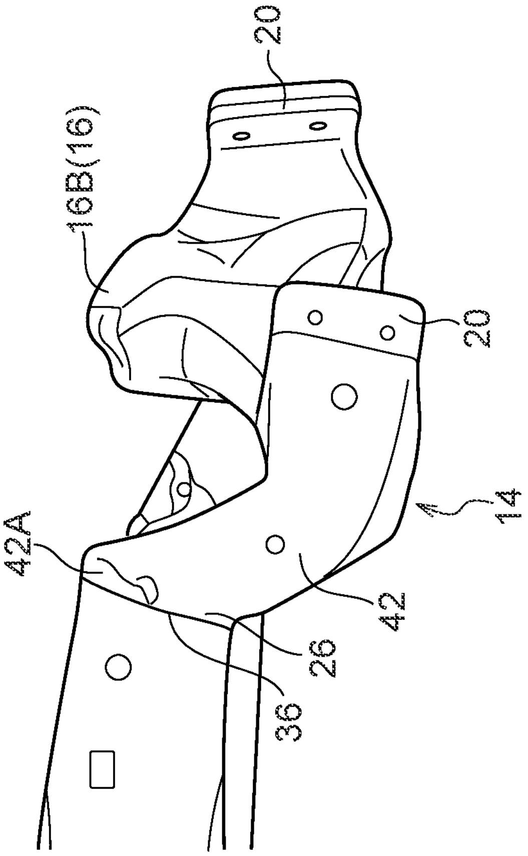
FIG. 5 is a left side view illustrating a state in which further deformation has occurred with respect to FIG. 3.
Figure 5:
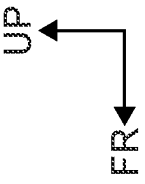
Figure 6:
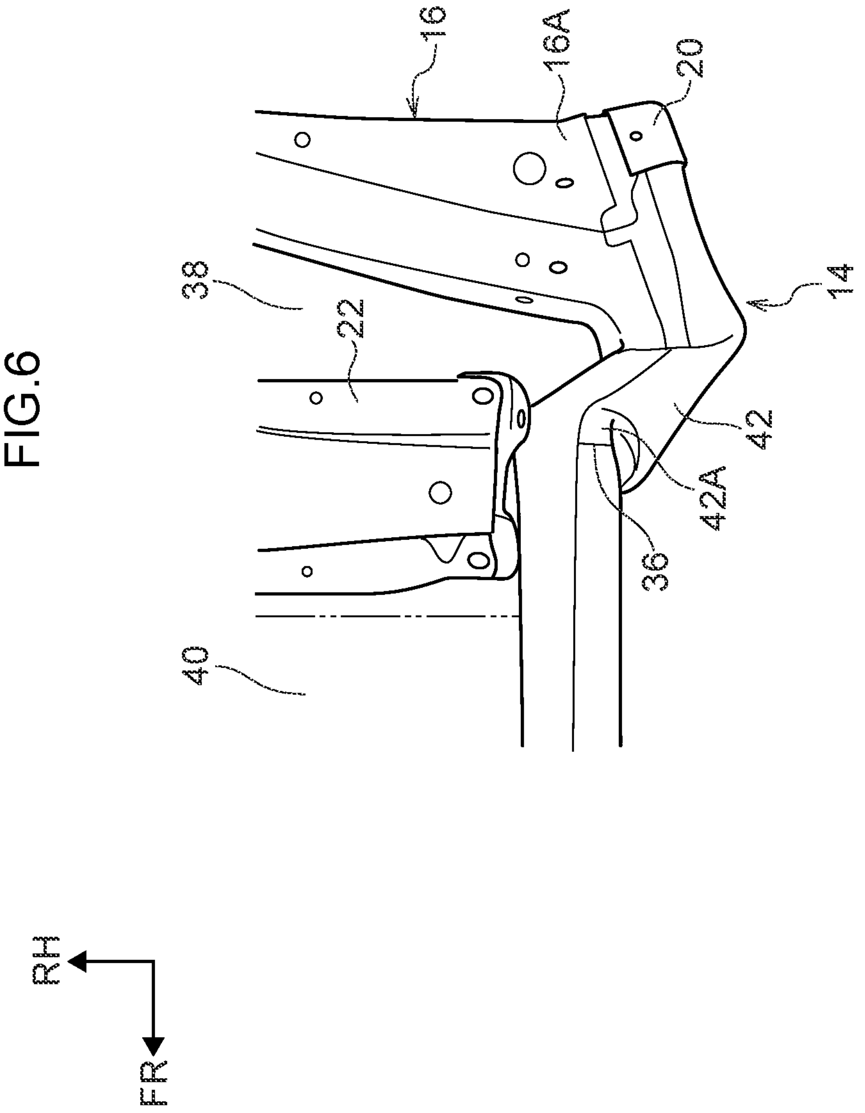
FIG. 6 is a top view illustrating a state in which further deformation has occurred with respect to FIG. 4.

Meanwhile, the second bead 26 is set so as to induce deformation of the rear side member 14 toward the lower side, when the collision load is input from the rear cross member 16 at the time of a rear collision of the vehicle 11. Thus, in the present exemplary embodiment, due to the second bead 26 being further provided, the rear side member 14 is deformed toward the lower side, as illustrated in FIGS. 5 and 6, when the collision load is input from the rear cross member 16 at the time of a rear collision of the vehicle 11. Consequently, movement of the rear cross member 16 toward the vehicle front side can be further suppressed, and influence on the battery 18, such as transmission of the collision load that has been input to the rear cross member 16 to the battery 18, or the like, can be further suppressed.

First and Second Beads

The first bead 24 and the second bead 26 will be explained in more detail.

As illustrated in FIGS. 1 and 2, in the present exemplary embodiment, for example, the first bead 24 is provided at the side toward the joining portion 20, which joins with the rear cross member 16, in the rear side member 14, is provided at the vehicle width direction inner side and at the upper end portion of the rear side member 14, and is formed to be concave toward the vehicle width direction outer side.

Consequently, when a collision load is input from the rear cross member 16 at the time of a rear collision of the vehicle 11, the rear side member 14 can be deformed toward the vehicle width direction inner side and deformed toward the lower side, with the first bead 24 as a starting point, as illustrated in FIGS. 3 and 4.

Meanwhile, the second bead 26 is provided in the rear side member 14 further toward the rear side than the battery 18 and further toward the front side than the first bead 24, is provided at the lower portion side of the rear side member 14, and is formed to be concave toward the upper side. Consequently, when the collision load is input from the rear cross member 16 at the time of a rear collision of the vehicle 11, the rear side member 14 can be deformed toward the lower side, with the second bead 26 as a starting point, as illustrated in FIGS. 5 and 6.

Further, the depth of the first bead 24 is set so as to be deeper than that of the second bead 26. Consequently, when the collision load is input from the rear cross member 16 at the time of a rear collision of the vehicle 11, the rear side member 14 can be deformed with the second bead 26 as a starting point as illustrated in FIGS. 5 and 6, after the rear side member 14 has been deformed with the first bead 24 as a starting point as illustrated in FIGS. 3 and 4.

Namely, when the collision load is input from the rear cross member 16 at the time of a rear collision of the vehicle 11, the rear side member 14 can be deformed toward the vehicle width direction inner side and deformed toward the lower side, with the first bead 24 as a starting point, and thereafter, the rear side member 14 can be deformed toward the lower side with the second bead 26 as a starting point. Consequently, a deformation shape of the rear side member 14 can be stabilized.

Further, as illustrated in FIGS. 1 and 2, in the present exemplary embodiment, the rear side member 14 is configured, for example, with the plural members 28, 30, and 32 along the vehicle front-rear direction, and the members 30 and 32 are welded together between the second bead 26 and the battery 18 in the vehicle front-rear direction of the rear side member 14.

Thus, by configuring the rear side member 14 with the plural members 28, 30, and 32, and by welding the members 28, 30, and 32 to each other at locations therebetween (at the welding portions 31, 33, 34), rigidity in the vehicle front-rear direction of the rear side member 14 can be improved. Further, by welding the members 28, 30, and 32 to each other at locations therebetween, a difference in rigidity between the welding portion 34 and the second bead 26 is further increased, and a deformation position having the second bead 26 as a starting point can be further stabilized.

Moreover, at the laser welding line 36 at which the members 30 and 32 are welded together, rigidity is higher than at positions at the front and rear of the laser welding line 36, and a reaction force with respect to an impact is also increased by a corresponding amount. Thus, due to the laser welding line 36 being formed so as to be inclined toward the upper side in the vehicle up-down direction on progression toward the rear side in the vehicle front-rear direction, after the rear side member 14 has been deformed toward the lower side with the second bead 26 as a starting point, wrinkling of a front end portion 42A of a deforming portion 42 of the rear side member 14 can be stabilized by the laser welding line 36, which has substantially the same shape, and movement of the deforming portion 42 toward the front side can be suppressed.

Further, in the present exemplary embodiment, the rear side member 14 is configured with the plural members 28, 30, and 32 along the vehicle front-rear direction of the rear side member 14. Furthermore, the vehicle front-rear direction positions of the welding portions 31, 33, and 34 at which the members 28, 30, and 32 are welded together are set so as to be different at the vehicle width direction inner side and the vehicle width direction outer side of the rear side member 14.

Thus, in the present exemplary embodiment, by changing portions having high rigidity and portions that are weak, at the vehicle width direction inner side and the vehicle width direction outer side, along the vehicle front-rear direction of the rear side member 14, a deformation mode can be adjusted in the rear side member 14.

Supplementary Note

It should be noted that the following configurations may be appropriately combined to configure the vehicle rear section structure according to the present embodiment.

Configuration 1

A vehicle rear section structure includes: left and right rear side members that are respectively provided at both vehicle width direction sides of a rear floor pan, and that each extend in a vehicle front-rear direction; a rear cross member that extends in a vehicle width direction, both vehicle width direction end portions of the rear cross member being respectively joined with vehicle front-rear direction rear end portions of the left and right rear side members; a battery or a fuel tank that is provided between the left and right rear side members, and that is disposed at a vehicle up-down direction lower side of the rear floor pan; and a first weak portion that is provided at a side toward a joining portion, which joins with the rear cross member, in each rear side member, that is weaker than other portions of the rear side member, and that is set so as to induce deformation of the rear side member toward a vehicle width direction inner side and toward a vehicle up-down direction lower side at a time of a collision from a vehicle rear side.

Configuration 2

A second weak portion that is provided in each rear side member further toward the vehicle rear side than the battery or the fuel tank and further toward a vehicle front side than the first weak portion, that is weaker than other portions of the rear side member, and that is set so as to induce deformation of the rear side member toward the vehicle up-down direction lower side at the time of a collision from the vehicle rear side, is further included.

Configuration 3

The first weak portion is a first bead that is provided in each rear side member at a vehicle width direction inner side and at a vehicle up-down direction upper end portion, and that is formed to be concave toward a vehicle width direction outer side, the second weak portion is a second bead that is provided in each rear side member at a vehicle up-down direction lower portion side, and that is formed to be concave toward a vehicle up-down direction upper side, and a depth of the first bead is set so as to be deeper than a depth of the second bead.

Configuration 4

Each rear side member is configured with plural members in the vehicle front-rear direction, the members are welded together between the second bead, and the battery or the fuel tank, in the vehicle front-rear direction of the rear side member, and a laser welding line at which the members are welded together is formed so as to be inclined toward a vehicle up-down direction upper side on progression toward a vehicle front-rear direction rear side.

Configuration 5

Each rear side member is configured with plural members in the vehicle front-rear direction, and vehicle front-rear direction positions of welding portions at which the members are welded together are set so as to be different positions at a vehicle width direction inner side and a vehicle width direction outer side of the rear side member.

Aside from this, the present disclosure may be implemented by carrying out various modifications in a range that does not depart from the spirit thereof. Furthermore, it goes without saying that the scope of rights of the present Disclosure is not limited to the above-described exemplary embodiments.

What is claimed is:

1. A vehicle rear section structure comprising:

left and right rear side members that are respectively provided at both vehicle width direction sides of a rear floor pan, and that each extend in a vehicle front-rear direction;

a rear cross member that extends in a vehicle width direction, both vehicle width direction end portions of the rear cross member being respectively joined with vehicle front-rear direction rear end portions of the left and right rear side members;

a battery or a fuel tank that is provided between the left and right rear side members, and that is disposed at a vehicle up-down direction lower side of the rear floor pan;

a first weak portion that is provided at a side toward a joining portion, which joins with the rear cross member, in each rear side member, that is weaker than other portions of the rear side member, and that is set so as to induce deformation of the rear side member toward a vehicle width direction inner side and toward a vehicle up-down direction lower side at a time of a collision from a vehicle rear side; and a second weak portion that is provided in each rear side member further toward the vehicle rear side than the battery or the fuel tank and further toward a vehicle front side than the first weak portion, that is weaker than other portions of the rear side member, and that is set so as to induce deformation of the rear side member toward the vehicle up-down direction lower side at the time of a collision from the vehicle rear side, wherein the first weak portion is a first bead that is provided in each rear side member at a vehicle width direction inner side and at a vehicle up-down direction upper end portion, and that is formed to be concave toward a vehicle width direction outer side, and the second weak portion is a second bead that is provided in each rear side member at a vehicle up-down direction lower portion side, and that is formed to be concave toward a vehicle up-down direction upper side, a depth of the first bead being set so as to be deeper than a depth of the second bead, and wherein each rear side member is configured with a plurality of members in the vehicle front-rear direction, the members are welded together between the second bead and the battery or the fuel tank, in the vehicle front-rear direction of the rear side member, and a laser welding line at which the members are welded together is formed so as to be inclined toward a vehicle up-down direction upper side on progression toward a vehicle front-rear direction rear side.

2. The vehicle rear section structure according to claim 1, wherein each rear side member is configured with a plurality of members in the vehicle front-rear direction, and vehicle front-rear direction positions of welding portions at which the members are welded together are set so as to be different positions at a vehicle width direction inner side and a vehicle width direction outer side of the rear side member.

* * * * *